April 28, 1925.

W. R. McGOWEN

BUMPER BRACKET

Filed Dec. 11, 1924

1,535,173

INVENTOR
William R. McGowen
By Kay, Totten & Martin,
Attorneys

Patented Apr. 28, 1925.

1,535,173

UNITED STATES PATENT OFFICE.

WILLIAM R. McGOWEN, OF McKEES ROCKS, PENNSYLVANIA, ASSIGNOR TO UNITED STATES CHAIN & FORGING COMPANY, OF PITTSBURGH, PENNSYLVANIA, A CORPORATION OF DELAWARE.

BUMPER BRACKET.

Application filed December 11, 1924. Serial No. 755,253.

*To all whom it may concern:*

Be it known that I, WILLIAM R. Mc-GOWEN, a citizen of the United States, and resident of McKees Rocks, in the county of Allegheny and State of Pennsylvania, have invented a new and useful Improvement in Bumper Brackets; and I do hereby declare the following to be a full, clear, and exact description thereof.

My invention relates to bumper brackets, and particularly to brackets especially suitable for supporting the bumper bars of motor vehicles and the like.

One object of my invention is to provide a bumper bracket suitable for attachment to automobile side frame members of different forms, and one which is adjustable within limits, to provide for the proper positioning of the bumper bar or other parts that may be supported by the bracket.

Another object of my invention is to simplify and improve generally the structure of devices of the character referred to.

Figure 1:
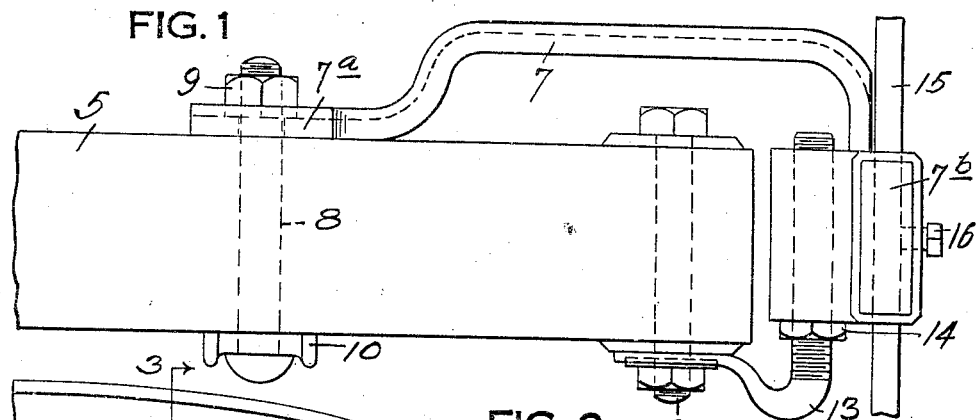
Figure 2:
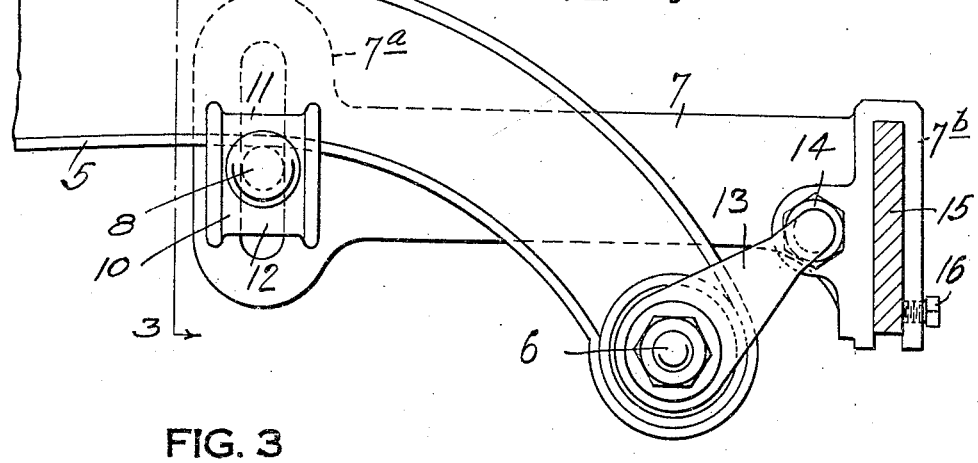
Figure 3:
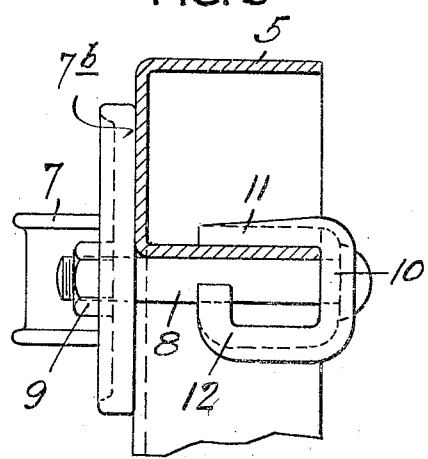
Figure 4:
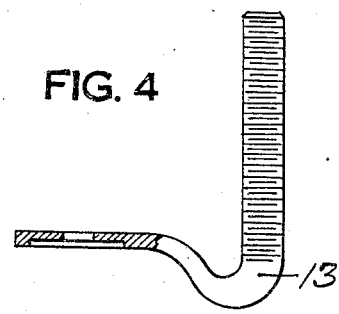

One form which my invention may take is shown in the accompanying drawing wherein Fig. 1 is a plan view of a portion of an automobile frame embodying my invention; Fig. 2 is a side elevational view thereof; Fig. 3 is an elevational view looking from the rear of Fig. 2, and Fig. 4 is a detail view showing the supporting arm for the bracket.

Only so much of an automobile frame 5 as is necessary to an explanation of my invention is shown. The member 5 represents one of the channeled side frames of an automobile and is provided with a shackle bolt 6 of standard form, by means of which the end of a spring (not shown) is secured thereto.

My device comprises a main bracket member 7 having a portion thereof off-set somewhat as shown in Fig. 1, in order to permit one end thereof to seat against the side frame 5 and the other end thereof to clear the head of the bolt 6. The rear end of the member 7 is provided with an enlarged vertically slotted portion 7ª (Fig. 2) by means of which it is adjustably secured to the side frame 5 through the medium of a bolt 8 that is disposed beneath the under side of the channel 5. The nut 9 of the bolt 8 has clamping engagement with the slotted portion 7ª and the head of the bolt 8 seats against a yoke member 10 having a horizontally extending portion 11 that rests upon the lower flange of the frame 5, and a horizontally and upwardly bent portion 12 provided with a groove at its end within which the mid-portion of the bolt 8 rests. It will be seen that the nut 9 of the bracket 7 may be supported in any desired position of vertical adjustment by the bolt 8 and the nut 9. The form and arrangement of the yoke member 10 and the bolt 8 are described and claimed in my Patent No. 1,513,714, issued to me October 28, 1924.

At its forward end the bracket 7 is provided with a vertically slotted portion 7ᵇ that may be formed integrally therewith and with a threaded opening with which one end of a bracket support 13 has threaded engagement so as to be adjustable laterally of the frame 5. The other end of the member 13 is perforated so that the end of the spring bolt 6 may extend therethrough and serve as a support for the member 13. The bracket support serves to maintain the forward end of the bracket 7 in proper vertical position and is adjustable by means of the threaded engagement just referred to, in order to accommodate the bracket 7 and its support 13 to frames of different widths. A lock nut 14 is provided for maintaining the parts 13 and 7 in adjusted position.

The forward portion 7ᵇ is adapted to receive a bumper bar or bumper bar supporting arm 15 that may be locked in position therein by a set screw 16.

By reason of the rotatable mounting of the bracket support 13 upon the shackle bolt 6 and its threaded engagement with the bracket 7, and also by reason of the adjustable connection between the slotted ends 7ª of the bracket 7 and of the bolt 8 the bracket may not only be readily adapted to frames of various sizes and forms but the bumper bar may be readily adjusted to the desired angular position with respect to the roadway.

Various changes in detail and general arrangement may be made without departing from the spirit and scope of the invention as defined in the accompanying claims.

I claim as my invention:

1. Bracket structure comprising laterally spaced members adapted to be disposed at opposite sides of an automobile frame, one of said members having screw threaded engagement with the other member, for lateral adjustment, and means for securing said members to said frame.

2. Bracket structure comprising members adapted to be secured to opposite sides of an automobile frame, one of said members having screw threaded engagement with the other member, for lateral adjustment, means for securing one of said members to a forward portion of the automobile frame, and means for securing the other of said members to a point rearwardly to the last-named point.

3. Bracket structure comprising members adapted to be secured to opposite sides of an automobile frame, one of said members having screw threaded engagement with the other member, for lateral adjustment, means for securing one of said members to the shackle bolt of the automobile frame, and means for securing the other of said members to a point rearwardly to the last-named point.

4. Bracket structure comprising two members adapted to be disposed at the opposite sides of an automobile frame, one of said members being pivotally connected to the other one thereof, means for securing said one member to a forward point on the frame, and means for securing the said other member to a point on the frame longitudinally removed from the first-named point.

5. Bracket structure comprising members adapted to be secured to an automobile frame, one of said members having pivotal connection with the other member thereof, about a horizontal axis, means for pivotally supporting said one member upon the vehicle frame, and means for supporting the other member for vertical adjustment on the frame.

6. Bracket structure comprising a main bracket member having a socket at its forward end for the reception of a member to be supported, and its rear end provided with means for effecting vertical adjustment, and a second member pivotally connected to the said main member and in turn provided with a pivotal support, said pivotal mountings having axes disposed at right angles to the plane of vertical adjustment.

7. Bracket structure comprising a main bracket member having a socket at its forward end for the reception of a member to be supported, and its rear end provided with means for effecting vertical adjustment, and a second member pivotally connected to the said main member and in turn provided with a pivotal support.

In testimony whereof I, the said WILLIAM R. McGOWEN, have hereunto set my hand.

WILLIAM R. McGOWEN.